United States Patent [19]

Weitzman

[11] Patent Number: 4,630,550

[45] Date of Patent: Dec. 23, 1986

[54] PREFABRICATED KNOCK-DOWN METAL-FRAME WORK TABLE

[75] Inventor: Harry L. Weitzman, White Plains, N.Y.

[73] Assignee: Jack J. Weitzman, Spring Valley, N.Y.

[21] Appl. No.: 719,214

[22] Filed: Apr. 2, 1985

[51] Int. Cl.[4] .................... A47B 47/02; F16B 7/00
[52] U.S. Cl. .................. 108/155; 108/111; 108/153; 403/171; 403/205
[58] Field of Search ............... 108/111, 153, 155; 211/182; 312/257 SK; 403/171, 176, 205, 295, 403

[56] References Cited

U.S. PATENT DOCUMENTS

| | | | |
|---|---|---|---|
| 2,654,487 | 10/1953 | Degener | 108/153 X |
| 2,874,708 | 2/1959 | Daus, Jr. | 108/153 X |
| 3,217,449 | 11/1965 | Levere | 211/182 X |
| 3,462,021 | 8/1969 | Hawke et al. | 211/182 |
| 4,027,987 | 6/1977 | Berkowitz | 403/295 X |

FOREIGN PATENT DOCUMENTS

| | | | |
|---|---|---|---|
| 2806764 | 8/1979 | Fed. Rep. of Germany | 403/171 |
| 910444 | 6/1946 | France | 403/171 |
| 1328449 | 4/1963 | France | 403/176 |
| 526319 | 9/1940 | United Kingdom | 211/182 |
| 2,110,786 | 6/1983 | United Kingdom | 403/171 |

Primary Examiner—Francis K. Zugel
Assistant Examiner—Peter R. Brown
Attorney, Agent, or Firm—Charles R. Rhodes; Judith E. Garnon

[57] ABSTRACT

A plurality of side rails, cross rails, side and corner legs are prefabricated from a square, tubular, 12 gauge steel material. Separable side and corner connecting members formed of substantially the same tubular steel material include projecting arms and bridging members that are inserted into the open ends of the side rails, cross rails, side and corner members to assemble the table. The connections are secured by bolting the structural frame members to the connecting members. Tubular rectangular side tracks are secured to the upper surface of the side rails in certain installations to provided support for wheeled carriages that are adapted to move longitudinally of the table. The side connectors and corner connectors are, in general, fabricated identically, then utilized in the assembly by slightly different orientation, hole patterns, and the use of the different bridging members.

5 Claims, 6 Drawing Figures

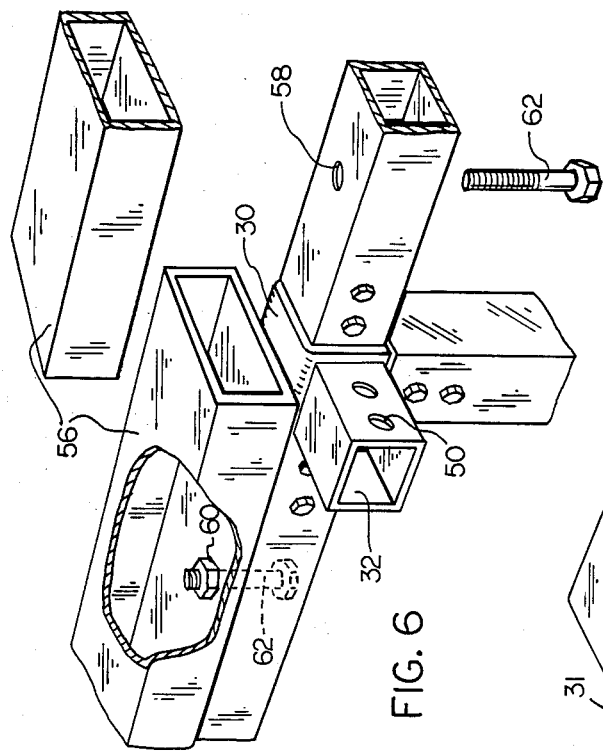
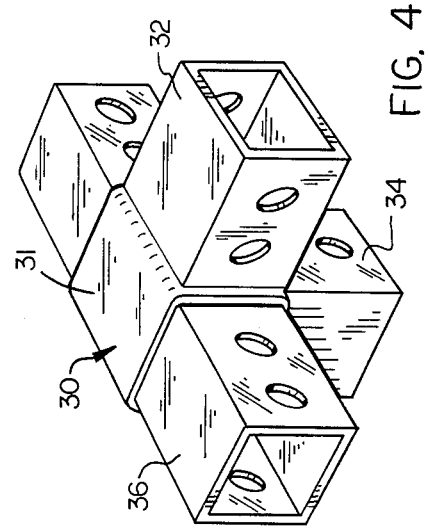
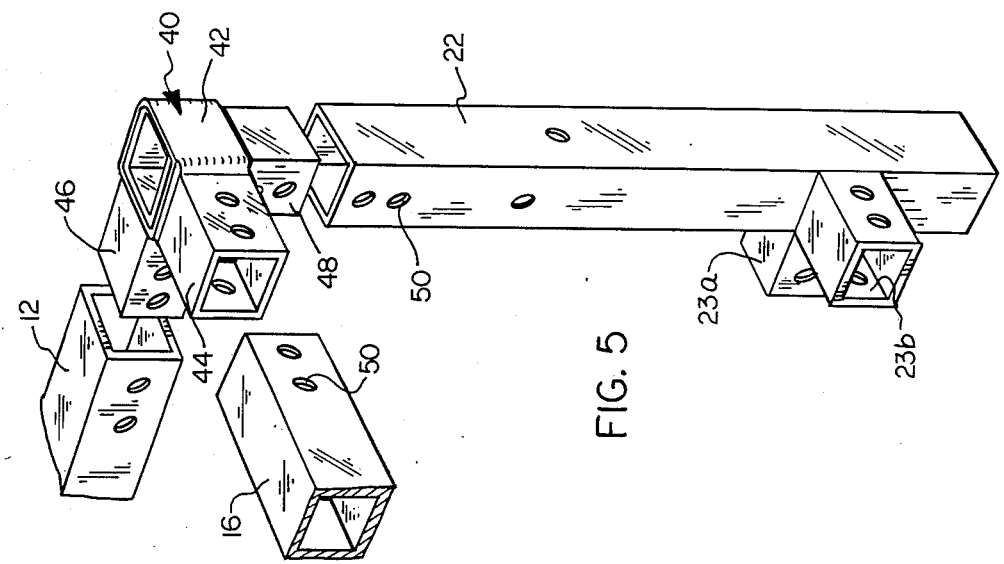

PREFABRICATED KNOCK-DOWN METAL-FRAME WORK TABLE

BACKGROUND AND SUMMARY OF THE PRESENT INVENTION

The present invention relates to industrial work tables, and more particularly to a prefabricated, knock-down, metal-frame work table that combines the attributes of (1) being conveniently packaged for shipment, (2) easily assembled at the job site, and (3) sufficiently sturdy to support heavy loads thereon, which loads are sometimes moving along the table. An example of such tables is the cutting and spreading table utilized in the textile industry on which a plurality of layers of fabric are placed one atop the other by a spreading machine that travels along the table. The mutli-layered stack of fabric is then cut to some predetermined pattern. The spreader, which can weigh up to 3000 pounds, travels from one end of the cutting table to the other, depositing successive layers of fabric onto the surface of the table. Work tables for such heavy duty purposes known in the past have simply not been of such construction as to provide a sufficiently sturdy work surface upon which to carry out such operations.

Examples of such work tables known heretofore are illustrated and described in U.S. Pat. Nos. 2,605,150; 2,731,316; and 3,280,766 to Cohen. The work tables described in each of these patents, while being intended for use in such environments as in the spreading and cutting of multiple fabric layers, were designed a number of years ago, before the equipment mounted thereon was as heavy as it is in today's installations. Therefore, the frame for the table is insubstantial to properly support work pieces and equipment of the type in industrial use today.

A further example of a work table of the prior art is the Bullmerwerk table manufactured by Bullmerwerk of Reutlingen, West Germany identified as "BULLMER Zuscheidestrabe-System-Komet Automatic." This table, while being a prefabricated knock-down work table which is somewhat sturdier than those known before, in that it utilizes square steel tubing as the frame members, is still not sufficiently sturdy in that the legs are formed in sections and the inter-connecting points are not suitable to result in a sturdy, secure structure.

The present invention is directed to an industrial work table that is prefabricated in a knock-down configuration for easy shipment and storage, yet when assembled is more sturdy than other work tables available to the industry. Several features of the invention combine to provide the ultimate superior results. The frame members are generally prefabricated from a square tubular steel material of at least a 12 gauge thickness. While separable side and corner connecting members are provided, they are formed of substantially the same tubular material having projections and bridging members that extend into the open ends of the structural rails and legs. The resulting connections are made more secure by bolting through the structural frame members and connecting members. The side and corner legs are of generally one piece construction with connecting projections that support the side and cross braces being welded to the side walls of the leg members. There is no break in the vertical member forming the legs. The basic configuration of the side connectors and corner connectors are fabricated identically, then utilized in the assembly by differing orientation, hole patterns, and the use of different bridging members.

Where the work tables of the present invention are intended for use in conjunction with the aforementioned spreading machines, a pair of tracks are secured to the upper rails of either side of the frame to provide a sturdy, steel support surface on which the wheels of the spreader may roll. This serves to protect the more easily damaged work surface, particularly the edges thereof, which is generally wooden or a laminated structure sometimes provided with tiny air holes through which air passes from an underlying plenum for forming an air cushion or a hold down feature.

It is therefore an object of the present invention to provide an industrial work table that is prefabricated in a knock-down configuration, yet when assembled, provides a stable work surface capable of supporting massive loads thereon.

Other objects and a fuller understanding will become apparent from reading the following detailed description in view of the accompanying drawings in which:

FIG. 4 is a perspective view illustrating one of the separable side connector members;

FIG. 5 is an enlarged perspective view illustrating a separable corner and

FIG. 6 is an enlarged perspective view illustrating the manner in which the track is constructed and mounted to the upper side rails of the table frame.

DETAILED DESCRIPTION OF A PREFERRED EMBODIMENT

Figure 1:
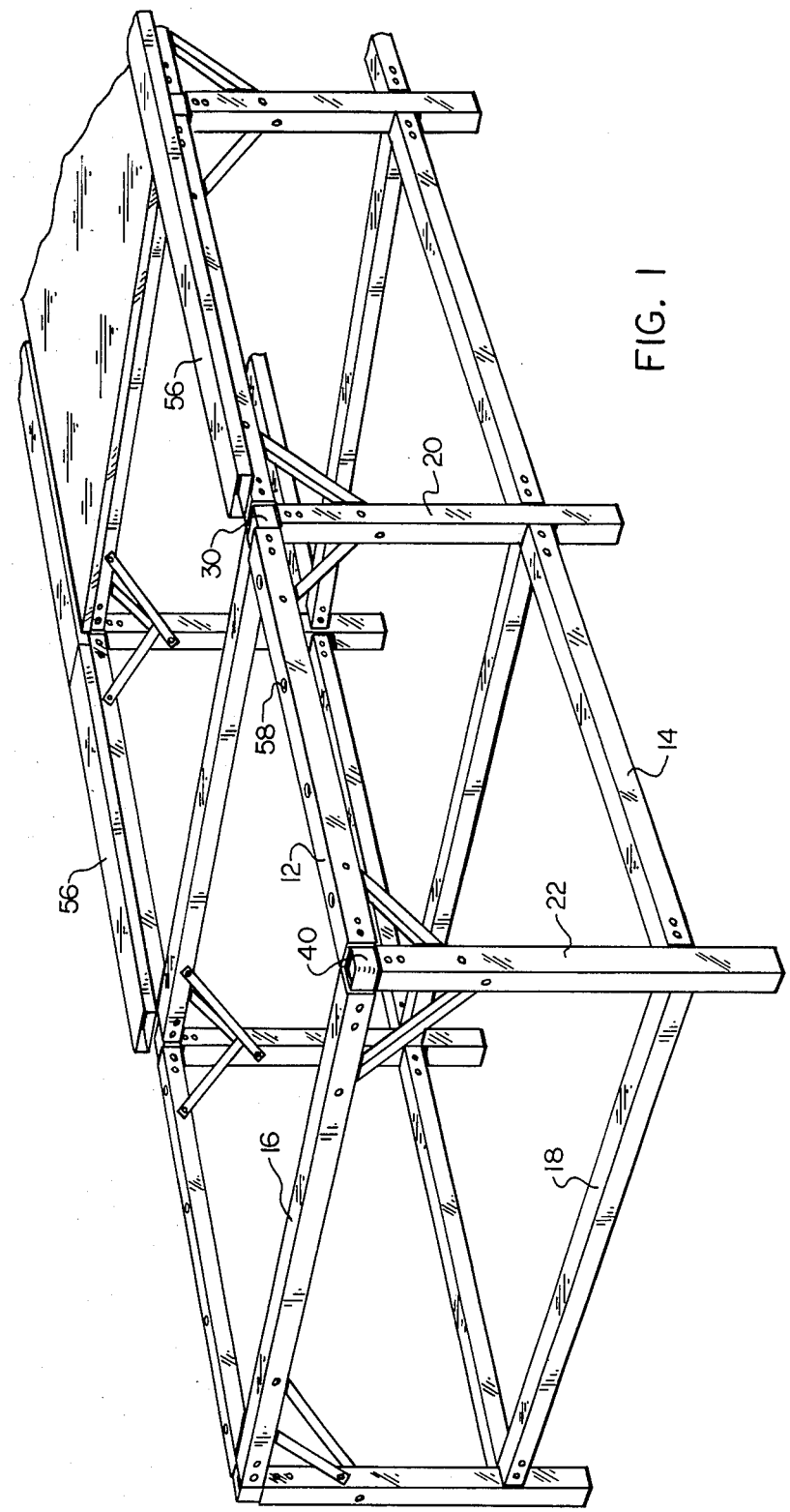
FIG. 1 is a perspective view illustrating the table according to the present invention.

Turning now to the drawings, there is illustrated in FIG. 1 the assembled table according to the present invention with some of the top panels and tracks removed for the purposes of illustration. In general, a completed table includes the table frame 10 which is assembled from component structural frame parts to be described hereinafter in modular sections, and a plurality of top panels T, there being one top panel for each modular section. While the top panels do not form a critical part of the present invention, it should here be mentioned that they may be either solid wood, laminated wood, laminated wood and polymeric layers, or laminated polymeric and metallic layers, depending upon the ultimate usage of the table. Further, the top panels may be perforated with a multiplicity of small holes therein and provided with a plenum chamber therebeneath for providing an air cushion by positive air flow through the perforation or a hold down feature by suction through the perforations. Again, however, the top panel construction is not a part of the present invention, it only being realized that this panel construction must be secure, stable, and protected from damage by the underlying and surrounding frame 10.

As previously described, the table is prefabricated, packaged, shipped, and installed at the job site. The only tools necessary for assembling the table are wrenches. The prefabricated members include a plurality of upper side rails 12, lower side rails 14, upper cross members 16 and lower cross members 18. In the illustrated embodiment the table width is somewhat greater than the length of a modular section, therefore upper side rails 12 are of a different length than upper cross rail 16 and the same holds true for lower side rails 14 and lower cross rails 18. In other embodiments in which each modular section was square, all rails could be substantially identical and interchangeable. However, for purposes of this discussion, it will be assumed that the table width is greater than the length of a modular side. Thus, there will be some difference between the length of side rails and cross rails. End rails and cross rails are identical.

In addition to the side rails and cross rails 12,14,16,18, the table frame includes side legs 20 and corner legs 22. Each of side rails 12,14, end rails 16,18, side leg members 20 and corner leg members 22 are formed of square steel tubing of a thickness of at least 12 gauge. It has been found that steel tubing of this thickness has the necessary rigidity to provide a stable support for extremely heavy loads, even where a significant part of the load may be moving.

Figure 2:
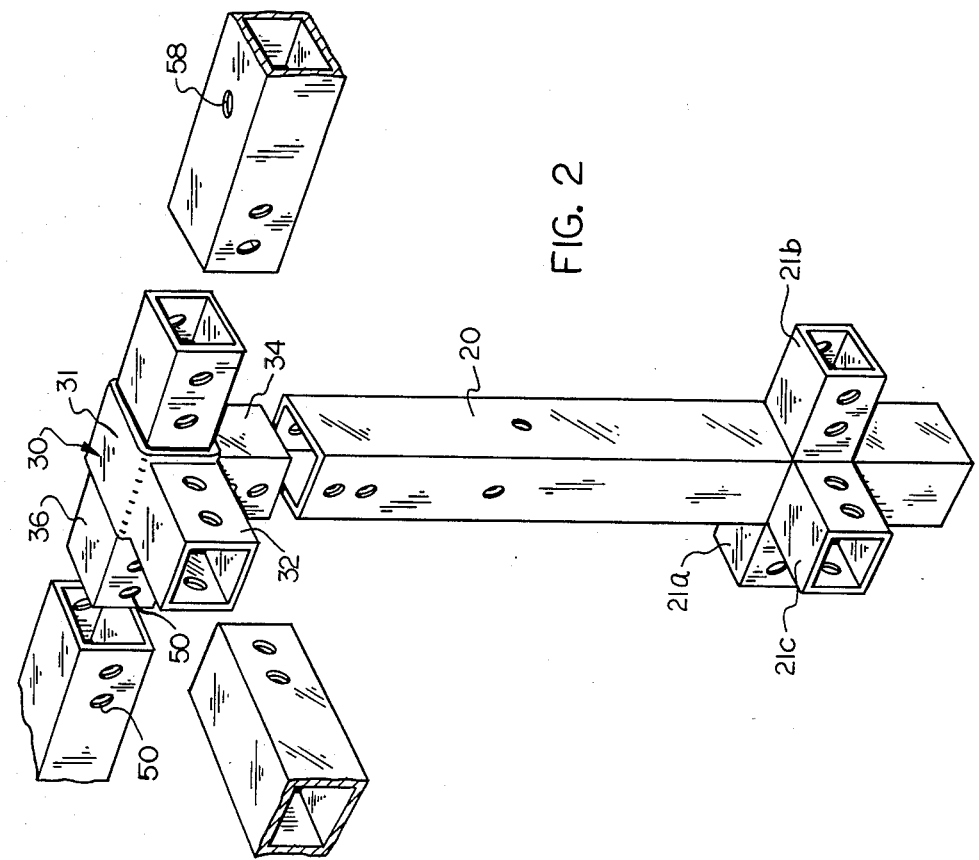
FIG. 2 is an enlarged perspective view of a portion of the side of the table illustrated in FIG. 1, illustrating the manner in which side sections of the table are connected.

Turning now to FIG. 2 there is illustrated a side leg 20 and the connection between two longitudinally adjacent upper side rails 12, two adjacent lower side rails 12 and upper and lower cross members 16,18. First of all, the side leg member 20 is formed of a single, unitary continuous length of square steel tubing extending from a point immediately beneath top rails 12 to the floor. Square steel tubing projections 21a,21b, and 21c are secured to and extend horizontally from the surface of three adjacent walls of the side leg 20 at a point spaced above the lower extremity thereof. Projections 21a,21b,21c are formed of one and three-quarter inch square, 11 gauge tubing, because it has been found that tubing of this size will fit satisfactorily between the walls of the two inch square, 12 gauge tubing. Thus, the aforementioned projections 21a,21b and 21c receive thereon the ends of two adjacent lower side rails 14 and a lower cross rail 18. The fact that the lower connector for the side and end leg members are welded or otherwise secured to the legs, rather than being provided as a separable connector, lends significantly to the sturdiness of the table of the present invention.

The upper side connector 30 is best illustrated in FIGS. 2 and 4, and is utilized for connecting the ends of two adjacent upper rails 12 and a cross member 16 to the upper end of a side leg 20. For this purpose, the side connector 30 includes a main body portion 31 of the two inch square, 12 gauge steel tubing approximately two inches long. Two one and three-quarter inch square steel tubing projections 32,34 are secured to (as by welding) and extend perpendicularly from the surface of two adjacent walls of the main body member 31 for insertion into the upper end of said side leg 12 and the adjacent end of the upper cross rail 16. A relatively short bridging member 36 formed of one and three-quarter inch square, 11 gauge tubing is inserted axially through the opening in the main body member 31 and extends longitudinally from each end thereof for insertion into the ends of the two adjacent side rail members 12. Preferably, the bridging member 36 is approximately eight inches long, and is not secured to the inner walls of the body member 31, however, becomes rigidly a part of the frame when the subsequent bolting operation is completed as will be described hereinafter.

At this point, some mention should be made of the different types of square tubing steel stock being utilized. It is no accident that the main structural members are formed of two inch 12 gauge material and that the projections and bridging members which slide into or through the two inch square tubing members are formed of one and three-quarter inch square 11 gauge material. This combination of stock material results in a snug fit of the projections and bridging members within the rails and legs, even before the bolting operation is completed. Further, the 11 gauge thickness of the extensions provides a substantial supporting wall thickness for the rails and leg members.

Figure 3:
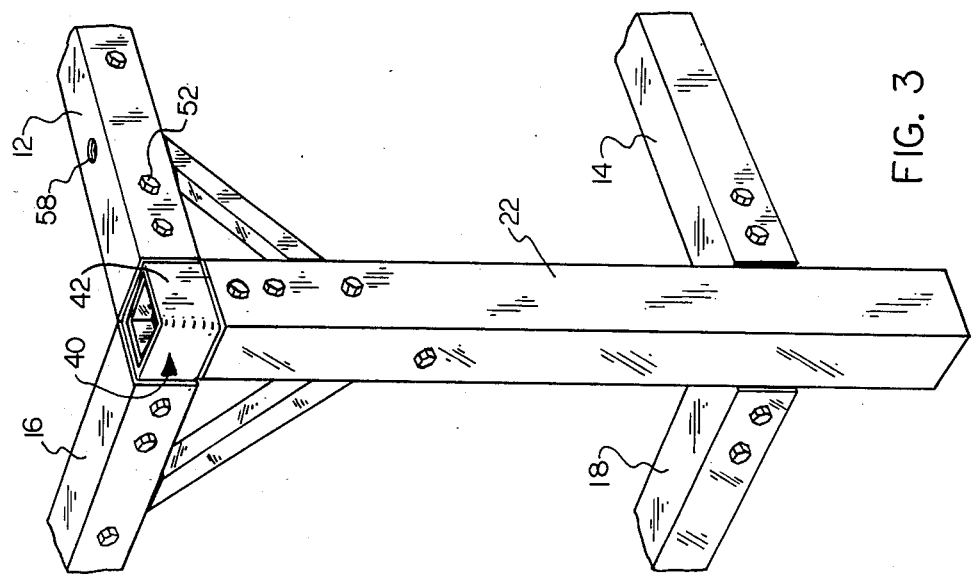
FIG. 3 is an enlarged perspective view illustrating a corner of the table of FIG. 1.

Turning now to FIG. 3, there is illustrated a section of the corner of table 10 which includes, first of all, a corner leg member 22, again formed of the two inch square, 12 gauge steel tubing. Again, the corner leg 22 is a single section of tubing which extends to the floor from a point immediately beneath the connection of the side rail 10 to the adjacent end rail 16. Two projections 23a,23b (similar to projections 21a–21c) are secured, preferably by welding, to and extend perpendicular from the surface of two adjacent walls of leg 22 at a point spaced above the lower extremity thereof for insertion into the ends of a lower side rail 14 and a lower cross rail 18.

A corner connector member 40 is formed again of a short section of two inch square, 12 gauge steel tubing similar to the body member 31 of side connector 30. Again, short projections 44,46 of the one and three-quarter inch square, 11 gauge tubing are connected to two adjacent wall surfaces of the body member 42. When used at the corners, however, the connector member 40 is oriented differently from the connector 30. Whereas the axis of the opening in the body member 31 is horizontal, the access of the opening in body member 42 is vertical, so that the projections 44,46 receive an upper side rail 12 and an end or cross rail 16. A second, shorter bridging member 48 is inserted into and extends downwardly from the body member 42. Since the axis of the opening in body member 42 is vertical, bridging member 48 is secured (preferably by welding) to the body member 42 for insertion into the upper end of leg 22.

As has been previously stated, the frame of the present invention is not held together merely by sliding the previously described projections and bridging members into the ends of the rails and leg members. In addition, a pair of mating holes 50 are provided through the opposite walls of the end portion of each rail member and leg member. Similarly a pair of mating holes are provided through the end portion of each projection and bridging member. Bolts 52 then make secure all connections. Some mention should be made here of another difference between the side connectors 30 and the corner connector 40 as far as the orientation of the bolt receiving holes 50 are concerned. As illustrated in FIG. 4, in body portion 31 holes 50 are formed parallel to the axis of the opening in the projection 32 and perpendicular to the axis of the opening in the downwardly extending projection 34. This is so that in the projection 32 no bolt heads or nuts interfere with the positioning of the table top. On the other hand, when the connector is used as a corner connector 40, the line formed by bolts 52 extending through holes 50 in projections 44 and 46 extend transverse or perpendicular to the axis of the opening in body member 42 in both instances.

Turning now to FIG. 6, there is illustrated the tracks 56 which extend along the upper surface of upper side rails 12. The tracks 56 themselves are formed of 1×3 inch rectangular, 11 gauge steel tubing. The tracks 56 are of such length as to extend from the centerline of one body member 31 to the centerline of the successive body member 31, there being a track section for each table section. A plurality of fastening holes 58 are drilled through upper side rails 12, which holes 58 align with and correspond to a plurality of similarly spaced holes 60 in the lower wall of tracks 56. Holes 60 in tracks 56 may either be tapped, or include a securing nut aligned with the holes 60 secured to the inner surface of the lower wall of track 56 for receiving and securing bolts 62 therein.

The planar top is then secured in some conventional manner atop frame 10 between the tracks 56 where such tracks are used. Again, the tracks are optional in situations where a sturdy support surface along which heavy pieces of equipment may roll are necessary. Some work tables will require no track at all, unless it is for merely decorative or finishing purposes. Also, while not described hereinabove, bracing 64 may be provided in a conventional manner.

While a preferred embodiment of the present invention has been described in detail hereinabove, it is obvious that various changes and modifications might be made without departing from the scope of the invention which is set forth in the following claims.

What is claimed is:

1. A heavy duty, knock-down, prefabricated, metal-frame work table capable of supporting heavy loads, as for example, stacks of textile fabric laid up in preparation for a cutting operation, which frame can be shipped in disassembled form and easily assembled at a work site, said frame comprising:

(a) a plurality of upper and lower end, side, and cross rails, each formed of a square steel tubing member open at the ends and of prescribed length;
    (b) a plurality of vertical corner leg members formed of square steel tubing, each of said corner leg members further including a square steel tubing projection secured to and extending horizontally from the surface of each of two adjacent walls at a point intermediate the top and bottom thereof, and an open top, one of said projections being inserted into the open end of one of said lower side rails and the other of said projections being inserted into the open end of one of said lower end rails;
    (c) a plurality of vertical side leg members formed of square steel tubing, each of said side leg members further including square steel tubing projections secured to and extending horizontally from the surface of three adjacent walls thereof at a point intermediate the top and bottom thereof and an open top, the central one of said projections being inserted into the open end of one of said lower cross rails and the other two projections being inserted into the open ends of two of said lower side rails:
    (d) a plurality of connector members having a body portion formed of square steel tubing, each of said side connector members including square steel tubing projections secured to and extending perpendicularly from the surface of two adjacent walls of the body portion thereof of such length and cross sectional dimension as to be insertable into the open end of one of said leg and rail members;
    (e) some of said connector members being arranged with the axis of the opening through the tubular body member aligned with the longitudinal axis of the upper side rails of said table, with one of said projections extending downwardly into the open top of a side leg member, and with the other of said projections extending horizontally inwardly into the open end of one of said upper cross rails, a relatively short bridging member formed of square steel tubing of such length and cross-sectional dimension as to be inserted axially through the opening in said tubular body portion and extend longitudinally from each end thereof for insertion into the ends of two adjacent upper side rail members;
    (f) other of said connector members being arranged with the axis of the opening through the tubular body member aligned with the longitudinal axis of one of said corner leg members, with one of said projections extending horizontally into the open end of one of said upper end rails, with the other of said projections extending horizontally into the open end of one of said upper side rails, and a relatively short bridging member formed of square steel tubing secured to and extending axially in a downwardly direction from the opening in said tubular body portion, said short bridging member being of such length and cross-sectional dimension as to be inserted into the upper end of one of said corner leg members;
    (g) each of said side rails, cross rails, leg members, projections and short bridging members being provided with a pair of openings in the opposite side walls thereof adjacent the free ends of said rails and the upper end of said leg members for receiving connecting bolts therethrough;
    (h) a planar top member secured across the top of said frame;
    (i) whereby said upper and lower side and cross rails are assembled to the projections and short bridging members extending from said side and corner members and bolted together to form said sturdy work table.

2. The work table according to claim 1 and further including a plurality of track sections formed of rectangular steel tubing and secured to the upper wall of said side members to form a pair of longitudinal tracks extending along each side of said work table.

3. The work table according to claim 2 wherein each of said side rail members are provided with a plurality of vertically extending openings therein and correspondingly spaced openings in the bottom wall of said track members, and a plurality of bolts securing said track members to said side rails through said mating openings.

4. The work table according to claim 1 wherein said side rails, cross rails, side legs, and corner legs are formed of linear sections of two inch square, 12 gauge steel tubing and wherein said projections and bridging members which make up said connector members are formed of one and three-quarter inch square, 11 gauge steel tubing.

5. The work table according to claim 1 wherein the body members and projections from the two adjacent side walls thereof of both the side connector members and corner connector members are each initially fabricated identically.

* * * * *